United States Patent [19]

Bass et al.

[11] 4,195,704
[45] Apr. 1, 1980

[54] HITCH ADAPTER

[75] Inventors: Merlyn D. Bass, Ottumwa; David L. Wolf, Cedar Falls; Ronald N. Grimstad, Centerville, all of Iowa; John M. Flenniken, Senonches, France

[73] Assignee: Deere & Company, Moline, Ill.

[21] Appl. No.: 914,562

[22] Filed: Jun. 12, 1978

[51] Int. Cl.² ............................................. B60D 1/00
[52] U.S. Cl. ................................... 180/14 R; 280/515
[58] Field of Search ............... 280/504, 506, 515, 482, 280/415 A, 142; 180/14 R; 403/373, 374, 13; 85/5 CP, 5 M, 5 N

[56] References Cited

U.S. PATENT DOCUMENTS

| 330,118 | 11/1885 | Holmes | 280/142 |
| 3,557,892 | 1/1971 | Burrough | 180/14 R |
| 4,008,905 | 2/1977 | Soteropulos et al. | 280/506 |

Primary Examiner—John A. Pekar

[57] ABSTRACT

An agricultural tractor includes a rearwardly extending drawbar connected to a hitch member on the tongue of a trailing implement through a hitch adapter that includes a housing mounted on the rearward end of the drawbar and connected thereto by a vertical pin extending through a vertical bore in the housing and the drawbar, the rearward end of the adapter being pivotally connected to the implement tongue by a vertical pin, the axis of which is equidistant from the front and rear universal joints of a PTO hook-up assembly that connects the tractor power take-off to the implement driveshaft. The housing has a cavity with a larger cross section than the cross section of the drawbar and a plate-like clamping element is mounted in the housing cavity and includes upwardly and outwardly diverging inclined surfaces that are engageable with the lower lateral corner edges of the drawbar, the clamp member being vertically adjustable so that when the inclined surfaces engage the edges of the drawbar they clamp the drawbar against the top of the housing while resisting lateral shifting of the drawbar in the cavity, thereby providing a simple adjustment to accommodate the hitch adapter to various size drawbars.

9 Claims, 4 Drawing Figures

HITCH ADAPTER

BACKGROUND OF THE INVENTION

This invention relates to a hitch adapter for connecting the tractor drawbar to the tongue of a trailing implement wherein the vertical pivot axis between the tractor and the implement is located equidistantly between the front and rear universal joints of a power take-off hook-up assembly that connects the tractor PTO to the implement drive shaft.

Hitch adapters of the above general type are disclosed in U.S. Pat. Nos. 3,557,892 and 4,008,905, both of which are assigned to the assignee herein, and a further improved adapter of said type is disclosed in U.S. patent application Ser. No. 850,348, now U.S. Pat. No. 4,156,473, which is also assigned to the assignee herein. As described in said patents and patent application, the location of the vertical pivot point equidistantly between the front and rear universal joints is desirable to provide equal angles of articulation at the front and rear universal joints when there is articulation about a vertical axis between the implement and the tractor, to thereby provide constant speed in the drive train and eliminate speed variations and vibrations in the drive system.

As described in said patents and patent application, one of the problems with such hitch adapters resides in the fact that the sizes of the tractor drawbars vary widely according to the size of the tractor and the manufacturer of the tractor. Both of said patents and also said patent application disclose means for adjusting the effective width of the cavity in the adapter that receives the drawbar to accommodate various width drawbars. In addition, said U.S. Pat. No. 4,008,905 discloses a shim type device for adjusting the vertical dimension of the cavity that receives one drawbar so that the hitch adapter can be mounted on drawbars having varying vertical thicknesses while tightly clamping the drawbar in a vertical direction.

SUMMARY OF THE INVENTION

According to the present invention, there is provided an improved hitch adapter of the above general type, with improved means for adjusting the adapter for different size drawbars.

More specifically, the hitch adapter is provided with a housing having top and bottom walls paced a greater distance than the vertical thickness of a drawbar, and a vertically adjustable clamping element is mounted in the housing between the housing wall and the drawbar to clamp the drawbar against the opposite wall of the housing.

An important feature of the invention resides in the provision of inclined surfaces on the clamping member opposite the drawbar, the inclined surfaces diverging laterally outwardly and toward the drawbar so that the fore and aft corner edges of the drawbar are engaged by the inclined surfaces, the location along the surface engaged by the corner edges being dependent on the width of the drawbar.

Another feature of the invention resides in the provision of simple and rugged means for vertically adjusting the clamping member, the adjusting means comprising a plurality of vertical bolts rotatable in the housing and threadably engageable with the clamping member so that simple rotation of the bolts causes vertical adjustment of the clamping member.

Another feature of the invention resides in the fact that the engagement of the drawbar with the inclined surfaces also clamps the drawbar to the adapter housing in a lateral direction.

Still another feature of the invention resides in an improved locking means on the housing for locking the vertical pins that respectively hold the adapter housing on the drawbar and connect the housing to the hitch member of the tongue, said locking means being simple and rugged in construction and easy for the operator to actuate without tools.

DESCRIPTION OF THE PREFERRED EMBODIMENT

Figure 1:
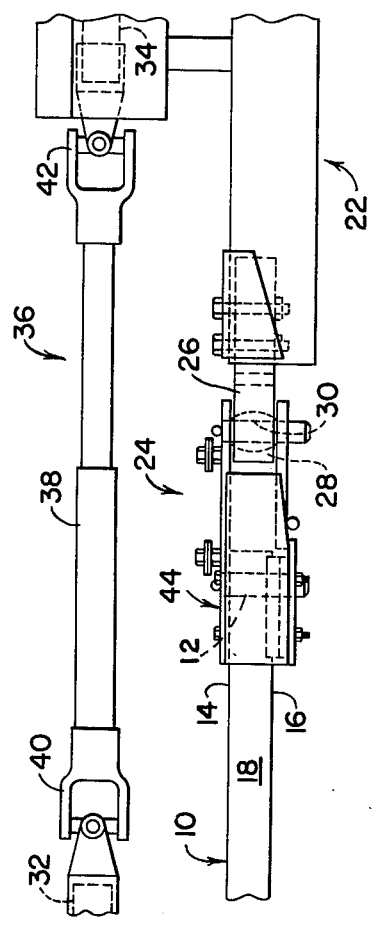
FIG. 1 is a side elevation view of the rearward portion of a tractor drawbar and the forward portion of an implement tongue and including the improved hitch adapter and the PTO hookup assembly connecting the tractor PTO to the implement drive shaft.
Figure 3:
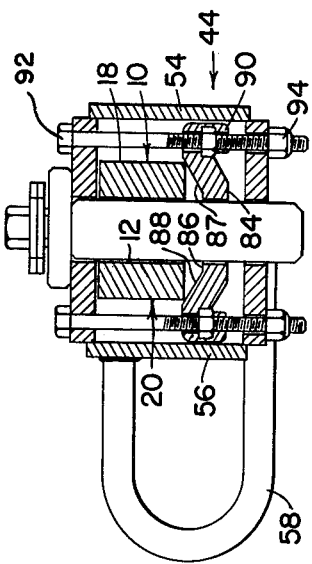
FIG. 3 is a vertical transverse section through the adapter along the lines 3—3 of FIG. 2 showing the adapter adjusted to accommodate the illustrated tractor drawbar.

The invention is embodied in a tractor-trailing implement combination, wherein the tractor includes a rearwardly extending drawbar 10 having a vertical bore 12 adjacent its rearward end, only the rearward portion of the drawbar being illustrated in the drawings. The drawbar has a rectangular cross section with horizontal top and bottom surfaces 14 and 16 respectively and right and left vertical sides 18 and 20 respectively. The drawbar is connectible to an implement tongue 22 by a hitch adapter, indicated in its entirety by the numeral 24. The tongue 22 includes a hitch member 26 at its forward end, the hitch member including a ball and socket type element 28 having a vertical bore 30.

The tractor has a rearwardly extending PTO output shaft 32 above the drawbar 10 and the implement has a fore and aft drive shaft 34 above the tongue 22, only the extremeties of said shafts being schematically shown in FIG. 1 since the construction is well known. As is also well known, a hook-up or power transmitting assembly 36 drivingly interconnects the PTO shaft 32 to the implement drive shaft 34. The hook-up assembly includes a telescoping central shaft portion 38, which accommodates articulation between the implement and the tractor, and front and rear universal joints 40 and 42 respectively, which are disposed at the front and rear ends of the hook-up assembly, the front universal joint 40 being releasably connected to the tractor PTO shaft 32.

The hitch adapter includes a fabricated housing 44 having a plate-like horizontal top wall 46 and a horizontal bottom wall 48 formed by a front portion 50 and a rear portion 52 that overlaps the front portion and is spaced from the top wall a lesser distance than the front portion. The top and bottom walls are interconnected by upright fore and aft right and left sidewalls 54 and 56, the housing walls being welded to adjacent walls to form a rigid housing having a fore and aft central cavity that is open to the front and to the rear and has a greater cross section than the usual tractor drawbar 10. A U- shaped handle 58 has its opposite ends welded to the housing and projects outwardly from the left side wall 56 to facilitate manipulation of the hitch adapter.

The housing includes vertically aligned front bores 60 through the top and bottom walls 46 and 48, and when the adapter is mounted on the drawbar, the bores 60 are aligned with the vertical bore 12 in the tractor drawbar 10. A vertical pin 62 is insertible in the aligned bores 12 and 60 to releasably connect the adapter to the drawbar, and a stop 64, in the form of a transverse rod that is welded to the top of the pin diametrally thereof, extends beyond the opposite sides of the pin to engage the top of the housing adjacent the bores and thereby prevent the downward escape of the pin from the housing and drawbar bores.

A pair of rearward, vertically aligned bores 66 are provided in the top and bottom walls 46 and 48 adjacent the rearward end of the housing, and when the implement is connected to the tractor drawbar through the hitch adapter 24, the bores 66 are aligned with the bore 30 in the hitch member 26. A vertical pin 68 is insertible downwardly through the bores 66 and 30 to releasably connect the implement to the hitch adpater, the pin 68 being provided with a stop 70 similar to the stop 64 to prevent the downward escape of the pin 68 from the housing and hitch member bores.

Figure 2:
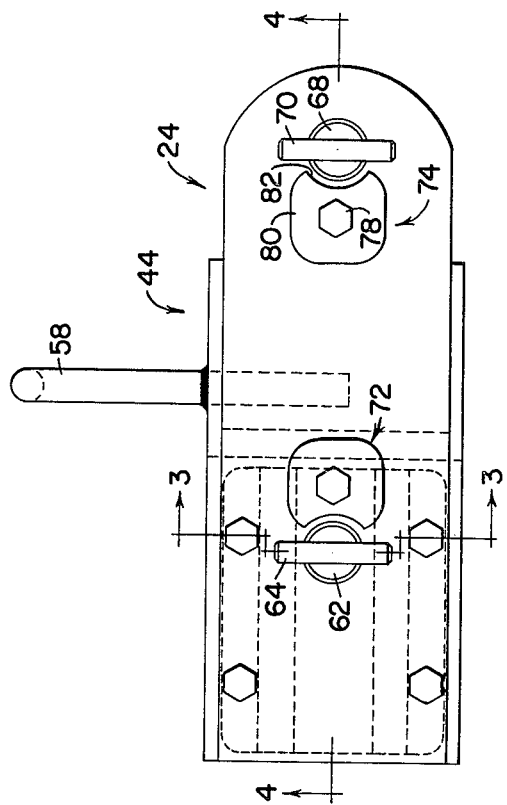
FIG. 2 is a plan view of the improved adapter.
Figure 4:
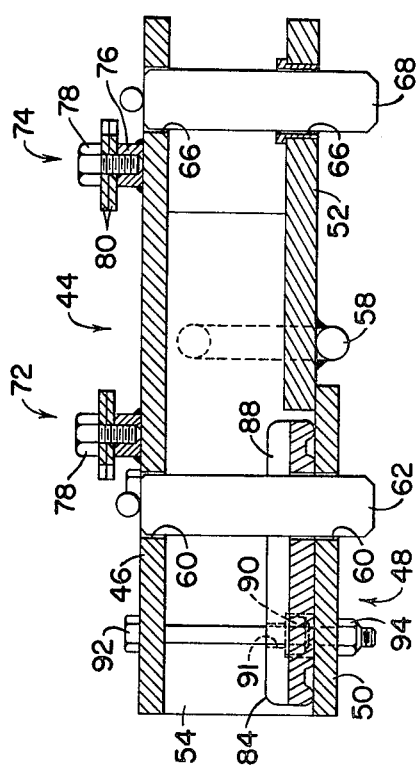
FIG. 4 is a vertical fore and aft section through the adapter taken along the lines 4—4 of FIG. 2.

Front and rear locking devices 72 and 74 are respectively mounted on top of the housing adjacent the front and rear bores 60 and 66 and operate to prevent the upward escape of the pins from the respective bores. Since the front and rear locking devices 72 and 74 are identical, only the rear device will be described in detail. The locking device includes a threaded member, here a conventional internally threaded nut, which is welded to the housing top wall, and a vertical bolt 78 is threadable into the nut 76. A pair of identical washers 80 are rotatably mounted on the bolts 78 between the bolt and the nut 76, and preferably the length of the bolt 78 is such that it bottoms out on top of the housing before it clamps the washers 80 between the nut and the bolt head so that the washers are free to rotate on the bolt. Obviously, the bolt could be made shorter so that the bolt head could be tightened against the washers to selectively lock the washers in a given position. Each washer 80 is provided with an arcuate indentation 82 along a peripheral edge, the radius of the indentation being slightly greater than the radius the adjacent bore. When the washers 80 are rotated on the bolt to the position shown in FIG. 2, wherein the center of curvature of the indentation is on the axis of the adjacent bore, the pin 68 can be vertically inserted or removed from the bores. However, if either washer is rotated to a position where the indentation is substantially nonconcentric with the bore, as is apparent, the washer will interfere with the vertical withdrawal of the pin. Two washers are provided on each locking device since there would be little possibility of the indentation on both washers being shifted to a position where they would allow inadvertent removal of the pin, although it has been found that a single washer will normally suffice to prevent inadvertent removal of the pin if the radius of curvature of the indentation is close enough to the diameter of the bore so that almost exact alignment of the washer indentation with the housing bore is necessary before the pin can be withdrawn. As is apparent, the washers 80 can be rotated to their unlocking position with one hand while the operator is inserting the pin with the other hand, without the need for separate or special tools to manipulate the locking device.

Mounted in the forward portion of the housing cavity is a generally horizontal, plate-like clamp member 84 that is disposed between the housing bottom wall 48 and the drawbar 10. The clamp member 84 includes a central fore and aft channel-shaped indentation 86 that has upwardly and outwardly inclined side walls or surfaces 87 and 88 that are symmetrical relative to a fore and aft vertical plane through the axis of the pins. The inclined surfaces 87 and 88 are spaced apart a distance that lies within the normal range of drawbar widths, so that if the clamp member were adjusted vertically, the lower fore and aft corner edges at the opposite sides of the drawbar bottom surface 16 would engage the clamp member 84 somewhere along the inclined surfaces 87 and 88. Mounted in the clamp member 84 adjacent the four corners thereof are four internally threaded inserts 90 that are disposed in vertical bores 91 in the clamp member, the threaded insert in the illustrated embodiment being conventional internally threaded nuts embedded or pressed into the bores 91. Four vertical bolts 92 extend downwardly through vertical bores in the top and bottom walls 46 and 48 that are aligned with the threaded inserts 90, the heads of the bolts seating against the top of the top wall while the lower ends of the bolts that protrude from the bottom wall are provided with lock nuts 94 that are seatable against the bottom of the bottom wall to releasably lock the bolts from turning, As is apparent, when the lock nuts are loosened, the bolts 92 can be rotated and since the threaded portions of the bolts extend through the internally threaded inserts 90, rotation of the bolts cause vertical shifting of the clamp member 84.

In operation, when the hitch adapter is used to provide equal angle articulation in the hook-up assembly, if the adapter is already mounted on the drawbar 10, the implement can simply be connected to the tractor by pulling the rear pin 68 and positioning the implement tongue 22 so that the bore 30 is aligned with the rear hitch bores, at which time the pin 68 is dropped through the aligned bores. To insert the pin, the locking device 74 must be shifted to its unlocking position as previously described and after the pin is in position, the washers 80 are rotated to prevent inadvertent withdrawal of the pin 68.

If the hitch adapter is not mounted on the tractor, but is rather mounted on the front of the implement tongue, which is frequently the case, the pin 62 is pulled and the bolts 92 are turned to adjust the clamp member 84 to a position wherein there is sufficient room between the clamp member and the top wall to permit fore and aft insertion of the rearward end of the drawbar 10 into the adapter member cavity. When the bore 12 in the drawbar is aligned with the front adapter bores 60, the pin 62 can be dropped into place to lock the hitch adapter to the drawbar, the locking device 72 being shifted to prevent withdrawal of the pin as previously described. To lock the hitch adapter and consequently the implement connected thereto from lateral or vertical movement relative to the drawbar 10, the four bolts 92 are rotated to draw the clamp member 84 upwardly against the bottom of the drawbar, the lower fore and aft corners of the drawbar engaging the inclined surfaces 87 and 88 to lock the hitch adapter to the drawbar in both a vertical and lateral direction. The lock nuts 94 are then tightened to maintain the position of the clamp member. If the clamp member is not tightened too tightly against the drawbar, it is possible to separate the hitch adapter from the drawbar in a fore and aft direction, so that the implement can be separated from the tractor drawbar simply by pulling the pin 62. As is apparent, only a simple standard wrench is necessary to adjust the hitch adapter to the particular size tractor drawbar being used and the hitch adapter can easily be mounted on the tractor drawbar 10 or the implement tongue 22 by simply manipulating the locking devices 72 and 74 and pulling or inserting the pins 62 and 68.

We claim:

1. In a tractor-trailing implement combination wherein the tractor includes a rearwardly extending drawbar, having a generally rectangular cross section with generally horizontal top and bottom surfaces and generally fore and aft corner edges along the lateral sides of said surfaces and a vertical pivot bore through the drawbar, and a rearwardly extending PTO output shaft and the implement includes a tongue, having a forward hitch member with a vertical pivot element, and an implement drive shaft connected to and driven by the PTO output shaft by a power transmitting assembly, having front and rear universal joints with vertical axes of articulation respectively spaced equidistant forwardly and rearwardly of the axis of the vertical pivot element, the combination therewith of an improved hitch adapter for connecting the drawbar to the implement hitch member and comprising:

a housing mounted on the rearward end of the drawbar and having top and bottom walls with inner surfaces, a forwardly open chamber adapted to removably receive the rearward end of the drawbar, and a first vertical bore;

a vertical pin removably extending through the vertical bore in the housing and the drawbar when the housing is mounted on the drawbar;

a vertical pivot means carried by the housing rearwardly of the pin and adapted to pivotally connect the housing to the pivot element of the implement hitch member;

a generally horizontal clamp member mounted in the housing chamber between the drawbar and one of said housing walls and including a surface opposite the drawbar, at least one of said surfaces opposite the drawbar having a pair of laterally inclined areas diverging toward the drawbar;

and adjusting means operative between the housing and the clamp member for selectively vertically adjusting the clamp member in the housing chamber so that the inclined areas are engageable with the corner edges of the opposite drawbar surface to vertically clamp the drawbar between the clamp member and the opposite housing wall.

2. The invention defined in claim 1 wherein the clamp member is disposed between the bottom surface of the drawbar and the bottom wall of the housing and the inclined areas are on the clamp member and diverge upward and outwardly and are engageable with the bottom corner edges of drawbar to clamp the drawbar against the top wall.

3. The invention defined in claim 1 wherein the adjusting means include a plurality of threaded vertical bores in the clamp member and a plurality of vertical bolt elements respectively rotatably mounted in the housing and threadable in the threaded bores to vertically shift the clamp member in response to rotation of the bolt elements.

4. The invention defined in claim 3 and including locking means operatively associated with each bolt element to limit vertical movement of the bolt element.

5. The invention defined in claim 1 wherein the vertical pivot element on the implement hitch includes a vertical bore and the housing includes a second vertical bore rearwardly of the first vertical bore and the vertical pivot means comprises a second vertical pin disposed in the vertical bore on the implement hitch and the second vertical bore in the housing.

6. The invention defined in claim 5 and including at least one locking means mounted on the housing and operatively associated with one of the vertical pins to releasably lock the pin in the vertical bores, each locking means including a generally horizontal locking element having an indentation on at least one side and vertical pivot means operatively mounting the locking element on the housing adjacent the pin for selective pivotal adjustment between a locking position, wherein a portion of the locking element overlies the pin to prevent vertical escape of the pin from the housing bore, and an unlocking position, wherein the indentation on the locking element is disposed above the pin and permits vertical passage of the pin past the locking element to permit vertical removal of the locking element from the housing bore.

7. The invention defined in claim 6 wherein a pair of said locking means are mounted on the housing and are respectively associated with the first and the second vertical pins.

8. The invention defined in claim 7 wherein the clamp member is disposed between the bottom surface of the drawbar and the bottom wall of the housing and the inclined areas diverge upward and outwardly, and are engageable with the bottom corner edges of the drawbar to clamp the drawbar against the top wall.

9. The invention defined in claim 7 and including locking means operatively associated with each bolt element to limit vertical movement of the bolt element.

* * * * *